(12) United States Patent
Hotta

(10) Patent No.: US 10,054,926 B2
(45) Date of Patent: Aug. 21, 2018

(54) PROGRAMMABLE CONTROLLER AND CONTROL METHOD OF PROGRAMMABLE CONTROLLER

(71) Applicant: Mitsubishi Electric Corporation, Tokyo (JP)

(72) Inventor: Tsutomu Hotta, Nagoya (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 298 days.

(21) Appl. No.: 14/910,713

(22) PCT Filed: Sep. 24, 2013

(86) PCT No.: PCT/JP2013/075716
§ 371 (c)(1),
(2) Date: Feb. 8, 2016

(87) PCT Pub. No.: WO2015/045004
PCT Pub. Date: Apr. 2, 2015

(65) Prior Publication Data
US 2016/0209823 A1    Jul. 21, 2016

(51) Int. Cl.
*G06F 19/00* (2018.01)
*G05B 19/05* (2006.01)

(52) U.S. Cl.
CPC ......... *G05B 19/054* (2013.01); *G05B 19/056* (2013.01); *G05B 2219/21053* (2013.01); *G05B 2219/25296* (2013.01)

(58) Field of Classification Search
CPC ............... G05B 19/054; G05B 19/056; G05B 2219/21053; G05B 2219/25296
See application file for complete search history.

(56) References Cited

U.S. PATENT DOCUMENTS

| 4,138,718 A | 2/1979 | Toke et al. |
| 5,675,830 A | 10/1997 | Satula |
| 6,148,349 A * | 11/2000 | Chow ............... G06F 15/17375 709/214 |
| 7,130,701 B1 | 10/2006 | Wischinski |

(Continued)

FOREIGN PATENT DOCUMENTS

| CN | 1834833 A | 9/2006 |
| CN | 1920712 A | 2/2007 |

(Continued)

OTHER PUBLICATIONS

Communication dated Oct. 9, 2017, from the European Patent Office in counterpart European Application No. 13894543.1.

(Continued)

*Primary Examiner* — Michael D Masinick
(74) *Attorney, Agent, or Firm* — Sughrue Mion, PLLC; Richard C. Turner

(57) ABSTRACT

A programmable controller of an embodiment is a programmable controller connected to a device to be a controlled object via a network, and includes a control unit that requests the device to notify an identifier of the device and mode information via the network, the mode information defining a utilized function and an operation method of the device; and a storage unit that stores the identifier and the mode information notified by the device via the network in response to the request.

7 Claims, 4 Drawing Sheets

(56) References Cited

U.S. PATENT DOCUMENTS

| | | | |
|---|---|---|---|
| 7,945,340 B2 | 5/2011 | Ueno et al. | |
| 8,165,699 B2 | 4/2012 | Ueno et al. | |
| 8,307,093 B2* | 11/2012 | Klemets | H04L 12/2818 370/254 |
| 2001/0056306 A1 | 12/2001 | Nakai et al. | |
| 2002/0133240 A1 | 9/2002 | Nagao et al. | |
| 2003/0144997 A1 | 7/2003 | Hugley | |
| 2006/0064385 A1 | 3/2006 | Susnjara | |
| 2006/0253626 A1 | 11/2006 | Ueno et al. | |
| 2009/0147309 A1 | 6/2009 | Nagashima | |
| 2009/0327496 A1* | 12/2009 | Klemets | H04L 12/2818 709/227 |
| 2011/0004685 A1 | 1/2011 | De Groot et al. | |
| 2011/0007906 A1 | 1/2011 | Konchitsky et al. | |
| 2011/0245936 A1 | 10/2011 | Hermann et al. | |
| 2013/0218302 A1 | 8/2013 | Leinen et al. | |

FOREIGN PATENT DOCUMENTS

| | | |
|---|---|---|
| CN | 103081412 A | 5/2013 |
| JP | 11-265280 A | 9/1999 |
| JP | 2000-163259 A | 6/2000 |
| JP | 2002-7299 A | 1/2002 |
| JP | 2002-269024 A | 9/2002 |
| JP | 2005-158026 A | 6/2005 |
| JP | 2007-536648 A | 12/2007 |
| JP | 2009-93258 A | 4/2009 |
| JP | 2009-145970 A | 7/2009 |
| JP | 2011-198237 A | 10/2011 |
| JP | 2012-519338 A | 8/2012 |
| WO | 2005/109131 A1 | 11/2005 |

OTHER PUBLICATIONS

Communication dated Nov. 9, 2016 from the European Patent Office in counterpart application No. 13894543.1.
Communication dated Oct. 31, 2016 from the State Intellectual Property Office of the P.R.C. in counterpart application No. 201380079753.X.
Communication dated Dec. 3, 2015, issued by the Taiwan Patent Office in corresponding Taiwanese Application No. 103101563.
Communication dated Aug. 2, 2017 from the State Intellectual Property Office of the P.R.C. in counterpart application No. 201380079753.X.
Taiwanese Search Report for TW 103101563 dated Apr. 15, 2015.
International Search Report for PCT/JP2013/075716 dated Oct. 22, 2013.

* cited by examiner

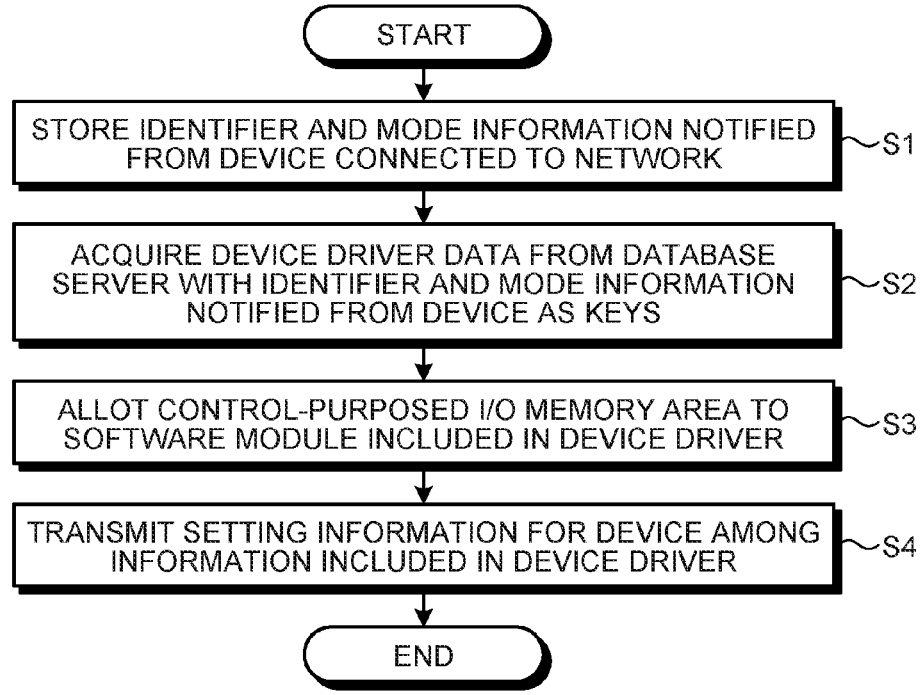
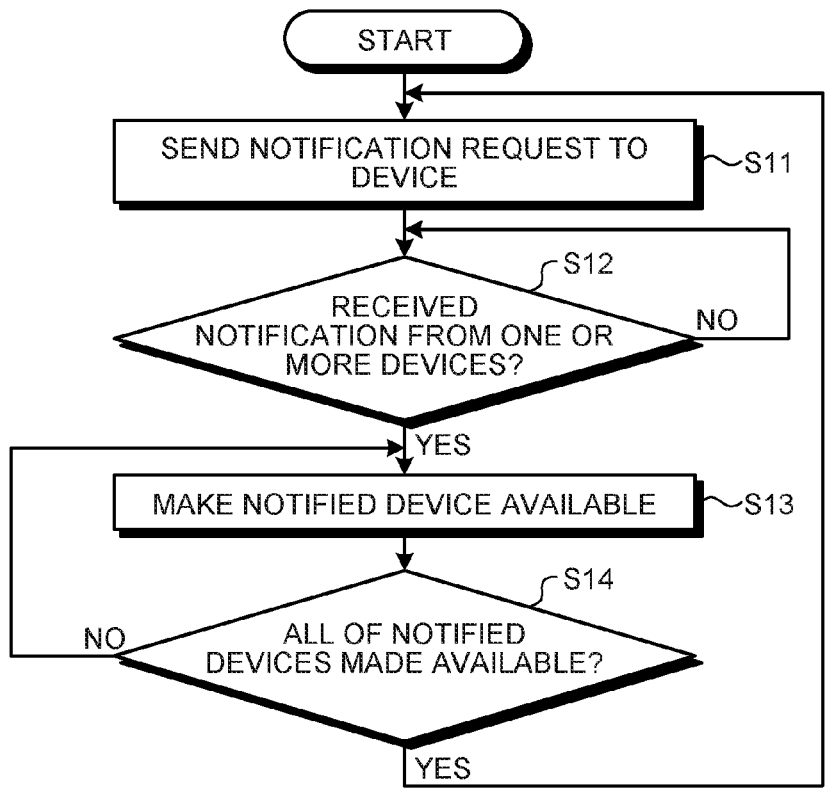

PROGRAMMABLE CONTROLLER AND CONTROL METHOD OF PROGRAMMABLE CONTROLLER

CROSS REFERENCE TO RELATED APPLICATIONS

This application is a National Stage of International Application No. PCT/JP2013/075716 filed Sep. 24, 2013, the contents of which are incorporated herein by reference in their entirety.

FIELD

The present invention relates to a programmable controller and a control method of the programmable controller that enables easy construction and management of an automatic machine by automatically providing a device driver required for operation to a device connected to a network.

BACKGROUND

To construct automatic machines in general as listed below, controllers such as a PLC (Programmable Logic Controller) or a motion controller are used.
   Machine Tool used in a field of FA (Factory Automation)
   Industrial automatic machine such as an industrial robot
   Autonomous robot
   General-purpose automatic machine such as automated facility of various types.

In such controllers, various types of input devices such as sensors and switches for inputting signals to the controller are connected. Similarly, various types of output devices such as motors and displays controlled by the controller are connected. Further, a program that describes commands (instructions) to those input and output devices is installed in the controller. The automated machine operates as the commands (instructions) described in the program are transmitted to the input and output devices.

The above input and output devices are respectively connected to input and output connectors of the controller (that is, input and output ports). In a case of using a conventional controller, a program creator needed to accurately grasp which types of input and output devices are (were) connected to which of the input and output ports (order numbers thereof) of the controller. Settings of software modules and operation programs for the device to be used in the controller were accurately performed with such prerequisite. Without doing so, the controller cannot otherwise perform accurate control by sending appropriate commands (instructions) to the device. Notably, the software modules for the device include a device driver, for example.

Conventionally, to construct and manage a system for an automatic machine, a programmable controller and various types of devices (sensor, vision sensor, robot, servo motor, inverter, and the like) need to be connected to each other, and device drivers for controlling them needs to be provided in the programmable controller and the various types of devices. Due to this, work such as connection of the various types of devices, setting installation for the various types of devices and the programmable controller, and reactivation upon a trouble occurrence is performed by a worker at an operation site of the system of the automatic machine, however, with increased numbers of the various types of devices, work cost incurred for the setup and reactivation upon the trouble occurrence increases.

As a method to reduce the work cost upon constructing the system, an invention that utilizes a plug-and-play function, which is a mechanism that allows a connected device represented by a USB or IEEE1394 to be used without having a user perform any special setting, to the programmable controller has been devised. A GUID (Global Unique Identifier) is an identifier that is capable of uniquely identifying a device without any overlap worldwide, and Patent Literature 1 discloses a technique in which the GUID of the connected device is collected, and a device driver, which is a collection of software modules and setting information such as device parameters required for the device identified by the collected GUID, is automatically linked and made available.

CITATION LIST

Patent Literature

Patent Literature 1: JP 2002-7299 A

SUMMARY

Technical Problem

However, the automatic link of the device driver in Patent Literature 1 as above cannot be said as automatically creating the link under a specific situation, but rather is on the premise that the user performs operation therefor.

For example, since some devices are capable of performing plurality of devices, a software module that is suitable for the execution within the programmable controller would be different depending on the function to be used; thus, a plurality of software modules needs to be provided.

In Patent Literature 1, a determination on the software module to be used upon when the aforementioned plurality of software modules is available to a specific device is performed manually by humans using a GUI. That is, in a case where a plurality of device drivers is available in the conventional programmable controller, the operation by the user was the prerequisite. Due to this, there has been a problem that cost for activation increases with larger-sized systems.

The present invention has been made in view of the above, and it is an object of the present invention to achieve a programmable controller that realizes plug-and-play of a connected device by enabling automatic link of a device driver, even in a case where there is a plurality of software module candidates for identifying the device driver to be linked.

Solution to Problem

To solve the above problem and achieve the object a programmable controller according to the present invention is connected to a device as a controlled object via a network, the programmable controller includes: a control unit that requests the device to notify an identifier of the device and mode information via the network, the mode information defining a function to be utilized by the device and an operation method of the device; and a storage unit that stores the identifier and the mode information that the device notified via the network in response to the request.

Advantageous Effects of Invention

The programmable controller according to the present invention achieves the effects that devices become available simply by connecting them by a plug-and-play function, system construction by the user becomes easy, and cost incurred for the system activation is reduced.

BRIEF DESCRIPTION OF DRAWINGS

FIG. 2 is a flowchart illustrating a flow of process until when a connected device becomes available by a plug-and-play function in the embodiment of the present invention.

FIG. 3 is a flowchart illustrating a flow of process of the plug-and-play function after when the programmable controller is connected to the network in the embodiment of the present invention.

DESCRIPTION OF EMBODIMENTS

Hereinbelow, an embodiment of a programmable controller and a control method of the programmable controller according to the present invention will be described in detail with reference to the drawings. Notably, the invention is not to be limited by the embodiment.

Embodiment

Figure 1:
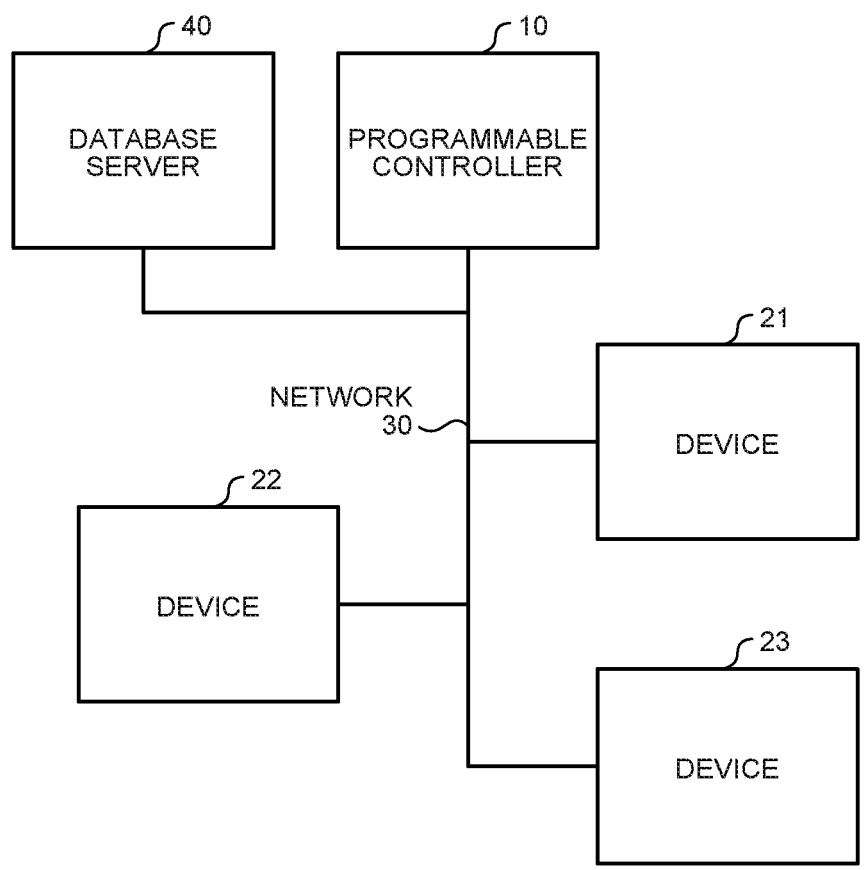
FIG. 1 is a diagram illustrating a configuration of a system in which various devices to be controlled objects and a database server are connected via a network to a programmable controller according to an embodiment of the present invention.

FIG. 1 is a diagram illustrating a basic configuration in which, as a configuration of an automatic machine of an embodiment of the present invention, a programmable controller 10 and devices 21, 22, and 23 being various devices to be controlled by the programmable controller 10 are connected via a network 30. The devices 21, 22, and 23 are specifically a sensor, a vision sensor, a robot, a servo motor, an inverter, and the like.

In FIG. 1, the programmable controller 10 is a programmable controller that is to be a primary element in automatic machine control. The devices 21, 22, and 23 are the various devices that operate as system elements under the control of the programmable controller 10. The network 30 is a network 30 that is to be a communication medium between the programmable controller 10 and the devices 21, 22, and 23 being the various devices that are the controlled objects. Further, a database server 40 is connected to the programmable controller 10 and the devices 21, 22, and 23 via the network 30, and is a database server including data of the devices 21, 22, and 23 being the various devices and device drivers corresponding thereto.

Figure 5:
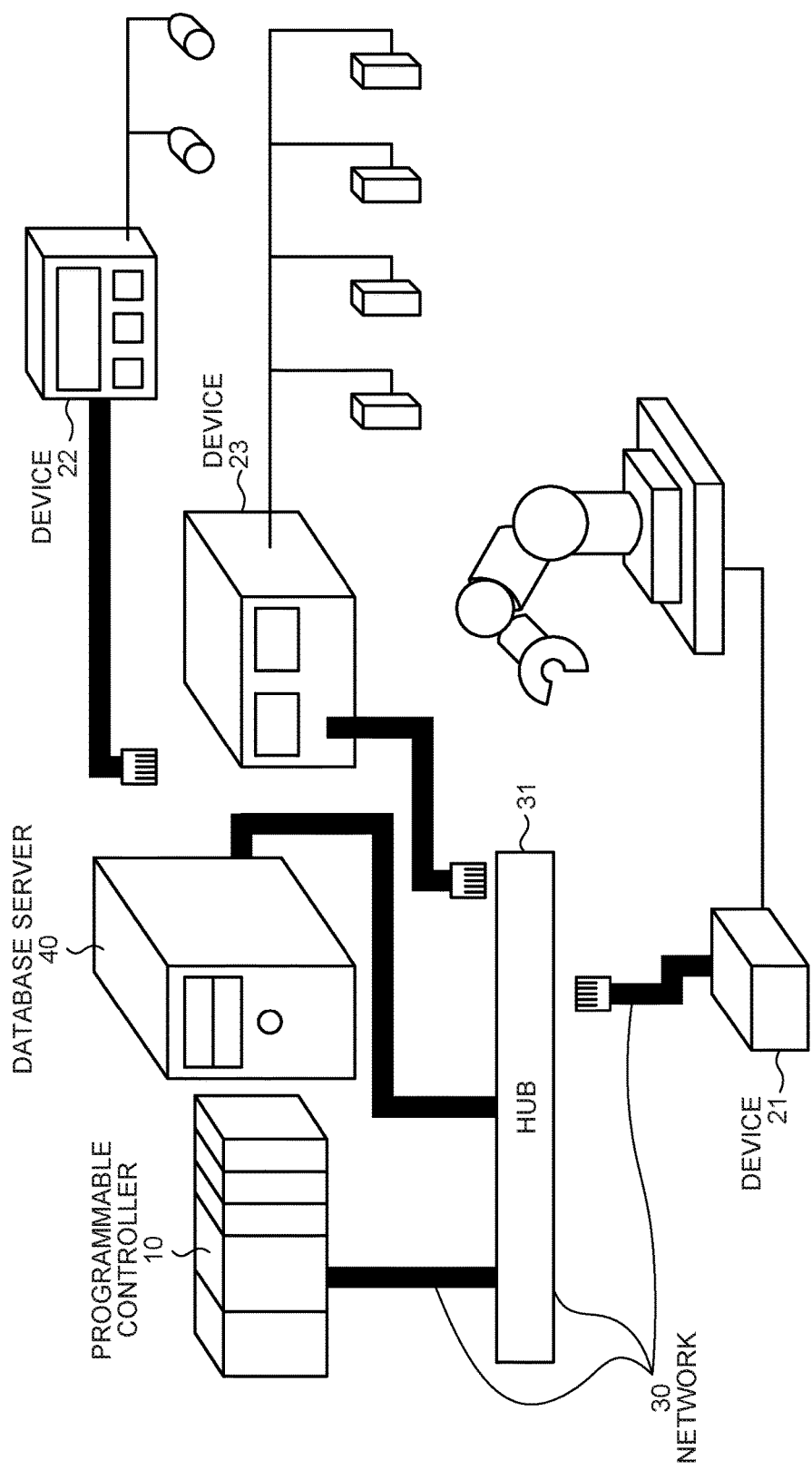
FIG. 5 is a diagram illustrating an example of a specific configuration of the system according to the embodiment of the present invention.

FIG. 1 is a simplified diagram illustrating an example of a specific configuration of a system illustrated in FIG. 5. In FIG. 5, a hub 31 is present at a center of the network 30. In FIG. 5, the devices 21, 22, and 23 are illustrated in a state of not yet connected to the network 30, however, FIG. 1 illustrates a configuration after all of the devices 21, 22, and 23 of the FIG. 5 have been connected.

Figure 4:
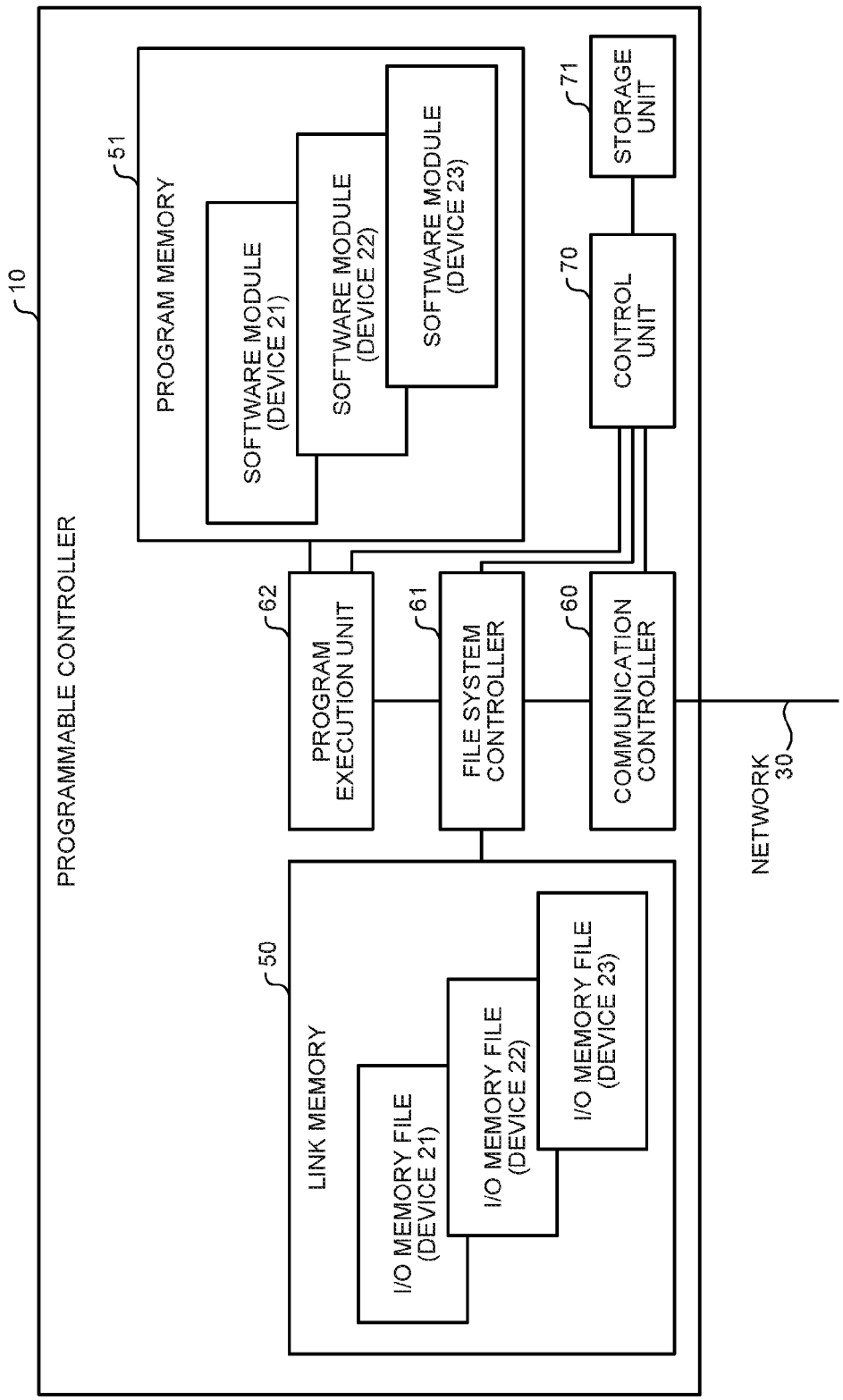
FIG. 4 is a diagram illustrating a detailed configuration of the programmable controller according to the embodiment of the present invention.

FIG. 4 is a diagram illustrating a detailed configuration of the programmable controller 10. The programmable controller 10 includes a communication controller 60, a file system controller 61, a program execution unit 62, a link memory 50, a program memory 51, a control unit 70, and a storage unit 71. Notably, the communication controller 60, the file system controller 61, the program execution unit 62, and the control unit 70 may have their functions realized by a same CPU and the like.

Next, with what sort of process a plug-and-play function is realized in the programmable controller 10 according to the present embodiment will be described.

FIG. 2 is a flowchart illustrating a flow of process by the programmable controller 10 since when a GUID being an identifier and mode information that defines function and operation method that a device utilizes is notified from the device until when the device is brought to be in an available state.

Firstly, the devices 21, 22, and 23 connected to the network 30 notify the programmable controller 10 of their GUIDs being the identifiers and mode information. Then, the programmable controller 10 stores the notified GUIDs being the identifiers and the mode information in the storage unit 71 in FIG. 4 so as to identify a device driver, which is a collection of settings and one or more software modules for enabling the device to become available (FIG. 2, step S1).

Next, the programmable controller 10 uniquely acquires the device driver from the database server 40 based on the GUIDs being the identifiers and the mode information that were notified and stored in the storage unit 71 (step S2). The database server 40 retains data of device drivers corresponding to various devices, and each device driver includes one or more software modules that control the connected device. The programmable controller 10 can uniquely identify the software module based on the mode information that defines the function and operation method utilized by the device connected to the network 30 from among the software modules included in each device driver. Thus, the operation by humans, which had conventionally been necessary, can be eliminated from the connection of the device until when the device is brought to be available.

The software modules included in the acquired device driver and selected based on the mode information are stored in the program memory 51. Further, an I/O memory area for a control purpose is allotted in the link memory 50 in the programmable controller 10 for each of the software modules stored in the program memory 51. Due to this, the software modules corresponding respectively to the devices 21, 22, and 23 are set in an executable state in the programmable controller 10 (step S3). Notably, since plural functions can be executed depending on the device, the suitable software module for execution in the programmable controller 10 may differ depending on the function to be used; thus, a plurality of software modules needs to be provided. That is, a plurality of software modules stored in the program memory 51 may exist for one device. Even in such a case, the I/O memory area is allotted in the link memory 50 for each of the software modules.

Further, in a case where setting information such as device parameters necessary for the devices 21, 22, and 23 exists in the device driver, such is transmitted to the devices 21, 22, and 23 via the network 30, and the connected devices 21, 22, and 23 become available (step S4). That is, the plug-and-play of the devices 21, 22, and 23 is realized.

Timing and method of notification from the devices 21, 22, and 23 to the programmable controller 10 in step S1 of FIG. 2 will be described below.

The devices 21, 22, and 23 have a link-completed state as a state in which the device driver has been linked. If the devices 21, 22, and 23 are not in the link-completed state, a notification of their GUID and mode information is performed in a case where a connection to the network 30 is detected, or in a case where a notification request from the programmable controller 10 is received.

Further, the devices 21, 22, and 23 stop the notification of their GUID and mode information via the network 30 at a time point when they are in the link-completed state, and do not perform the notification even when the notification request from the programmable controller 10 is received.

FIG. 3 is a flow chart illustrating a flow of plug-and-play function process after the programmable controller 10 has been connected to the network 30.

In a case of having detected its connection to the network 30, the programmable controller 10 sends the notification request to all of the devices connected to the control unit 70 via the network 30, which are in the example of FIG. 1 the devices 21, 22, and 23 (FIG. 3, step S11).

Then, a determination is made on whether or not a notification from one or more devices has been received (step S12). In a case of having received the notification from one or more devices (step S12: Yes), the series of process illustrated in the flow chart of FIG. 2 is performed to bring the notified device to be available (step S13).

Further, in a case where the notification from the devices cannot be received (step S12: No), a standby state is commenced and thus no action is taken, and the process returns to step S12.

After the step S13, a determination is made on whether or not all of the notified devices have been made available (step S14). The step S13 (procedures in FIG. 2) is repeated for all of the devices that had made the notification until when all of the notified devices become available (step S14: No).

In a case where all of the notified devices become available (step S14: Yes), that is, after when the programmable controller 10 has performed the plug-and-play process to all of the notified devices, the process returns to step S11, and the control unit 70 of the programmable controller 10 restarts to send notification requests to the devices via the network 30 by controlling the communication controller 60.

In the present embodiment, after all of the notified devices become available (step S14: Yes), the programmable controller 10 once again sends the notification requests to the devices via the network 30 (step S11). Thus, the device connections can be detected even with frequent situations where a large number of devices is to be connected, and in cases where the notification receipt from other devices has failed.

By the above detection method, as compared to a method that repeats the notification requests periodically to an entirety of the network 30 so as to confirm whether a newly connected device exists or not, a load on the network 30 in connection to device detection can be reduced.

Further, the notification timings of the GUID being the identifier and the mode information from devices may be staggered so as to disperse the load on the network 30.

The allotment of the I/O memory areas for linking purposes in the step S3 of FIG. 2 will be described below with reference to FIG. 4.

In the allotment of the I/O memory areas in the step S3, an I/O memory file having a file content of I/O information for controlling a device is allotted to the link memory 50 being the memory area dedicated to each device. However, the link memory 50 is managed by a generally available file system, and the I/O memory files are managed in file units via the file system controller 61.

As an operation during the plug-and-play execution, firstly, the I/O memory file having the file content of I/O memory is created in the link memory 50 in the programmable controller 10 (FIG. 2, step S3).

Subsequently, the software modules that operate on the programmable controller 10 and included in the device driver acquired from the database server 40 in the step S2 in FIG. 2 are linked with the I/O memory file, and they are utilized as control information.

As illustrated in FIG. 4, during communicating between the programmable controller 10 and the devices 21, 22, and 23, the control unit 70 performs control so that the referencing and modification of the I/O memory file is performed from the communication controller 60 via the file system controller 61. When the programmable controller 10 is executing the program, the control unit 70 performs control so that the referencing and modification of the I/O memory file is performed from the program execution unit 62 via the file system controller 61.

A file name of the I/O memory file created in the step S3 of FIG. 2 is a unique file name that is determined based on the GUID of the device to which the I/O memory is to be allotted.

The memory to be allotted to the device to be connected to the automatic machine system would have increased management cost with increased system size, so the link-purposed I/O memory can easily be managed by managing the I/O memory as a file, as in the present embodiment.

In addition, effects of improved convenience to utilize functions such as monitoring and logging in device units can be expected.

With the allotment of the I/O memory areas and the linking of the software modules of the device drivers corresponding to the devices 21, 22, and 23 in the step S3, for example, when a control-purposed software module (device 21) for the device 21 is to be executed, the program execution unit 62 refers to data in the I/O memory file (device 21) allotted via the file system controller 61. In a case where a modification request to the I/O memory file (device 21) is occurring after the execution of the control-purposed software module (device 21) for the device 21 is completed, the content thereof is written back via the file system controller 61. Notably, the program execution unit 62 may for example execute a device control-purposed software module with a communication from this device as a trigger.

As described above, in the programmable controller and the control method of the programmable controller according to the present embodiment, the mode information for identifying the utilized function and operation method of a device is provided among the information to be collected from the device, and is collected together with the GUID. Thus, the software module can uniquely be identified even in cases where there is a plurality of software module candidates for identifying the device driver to be linked, based on the mode information that defines the utilized function and operation method of the device. Thus, the plug-and-play function can be provided without needing any manual operation by humans, aside from the physical connection of the device to the network.

Moreover, the invention of the present application is not limited to the above embodiment, and in carrying out the invention, various modifications may be made within the scope that does not go beyond the essence thereof. Further, the above embodiment includes inventions of various levels, and numbers of inventions may be extracted therefrom by suitable combinations of the disclosed plurality of constituent features. For example, even if some of the constituent features are omitted from the entire set of constituent features shown in the embodiment, the configuration with said constituent features omitted may be extracted as an invention, if the problem described in the section of the technical problem can be solved, and the effect described in the section of the advantageous effects of the invention can be achieved. Furthermore, constituent features among different embodiments may suitably be combined.

INDUSTRIAL APPLICABILITY

As above, the programmable controller according to the present invention is useful in a programmable controller installed with the plug-and-play function suitable for system construction, and especially is suitable for the construction of automatic machines.

REFERENCE SIGNS LIST

10 PROGRAMMABLE CONTROLLER
21, 22, 23 DEVICE
30 NETWORK
40 DATABASE SERVER
50 LINK MEMORY
51 PROGRAM MEMORY
60 COMMUNICATION CONTROLLER
61 FILE SYSTEM CONTROLLER
62 PROGRAM EXECUTION UNIT
70 CONTROL UNIT
71 STORAGE UNIT

The invention claimed is:

1. A programmable controller connected to a database server and a device as a controlled object via a network, the programmable controller comprising:
a control unit to request the device to notify an identifier of the device and mode information via the network, the mode information defining a function to be utilized by the device and an operation method of the device;
a storage unit to store the identifier and the mode information that the device notified via the network in response to the request;
a program memory to store a plurality of software modules to control the device, which are included in a device driver acquired from the database server based on the identifier and the mode information;
a link memory to store an I/O memory file in which I/O information to control the device is described;
a file system controller to manage the I/O memory files; and
a program execution unit to reference and modify the I/O memory file via the file system controller when executing each of the plurality of software modules, wherein the link memory is allotted with an I/O memory area to store the I/O memory file corresponding to each of the plurality of software modules.

2. The programmable controller according to claim 1, wherein the program execution unit executes each of the plurality of software modules with a communication from the device as a trigger.

3. A control method of a programmable controller, the method comprising:
requesting a device as a controlled object connected to the programmable controller to notify an identifier of the device and mode information that defines a function to be utilized by the device and an operation method of the device;
storing the identifier and the mode information that the device notified in response to the request;
acquiring a device driver comprising a plurality of software modules from among a plurality of device drivers, from a database server connected to the programmable controller, based on the identifier;
acquiring at least one software module from among the plurality of software modules of the acquired device driver, based on the mode information;
securing an area for storing I/O information for controlling the device corresponding to each of the at least one software module; and
referencing and modifying the I/O information when executing each of the at least one software module.

4. The control method of a programmable controller according to claim 3, the method further comprising:
requesting the device connected to the programmable controller to notify the identifier of the device and the mode information that defines the function to be utilized by the device and the operation method of the device, after the securing the area for storing the I/O information.

5. The control method of the programmable controller according to claim 3, wherein the plurality of device drivers respectively correspond to a plurality of devices controlled by the programmable controller and wherein the plurality of software modules in the device driver are uniquely identified by a respective plurality of mode information.

6. The control method of the programmable controller according to claim 3, wherein the device is connected to the programmable controller via a plug and play.

7. The control method of the programmable controller according to claim 3, further comprising storing the acquired at least one software module in a program memory of the programmable controller.

* * * * *